Dec. 16, 1958  D. J. LA BELLE  2,864,454
LOAD RESPONSIVE FLUID SUSPENSION AND TRACTION
INCREASING SYSTEM FOR TANDEM AXLES
Filed June 20, 1956
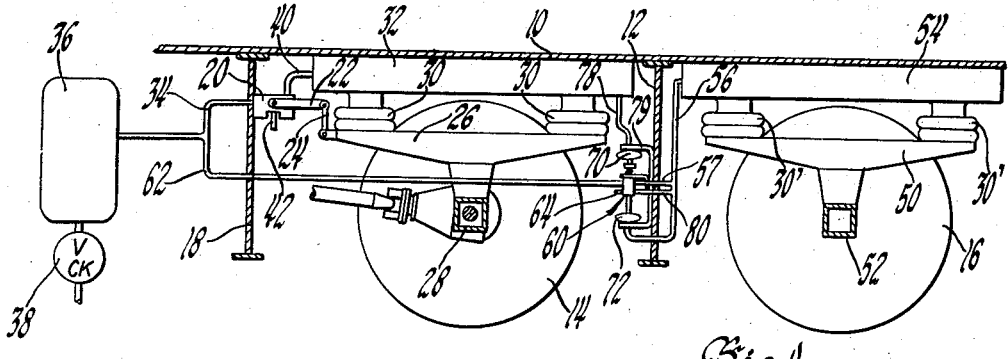
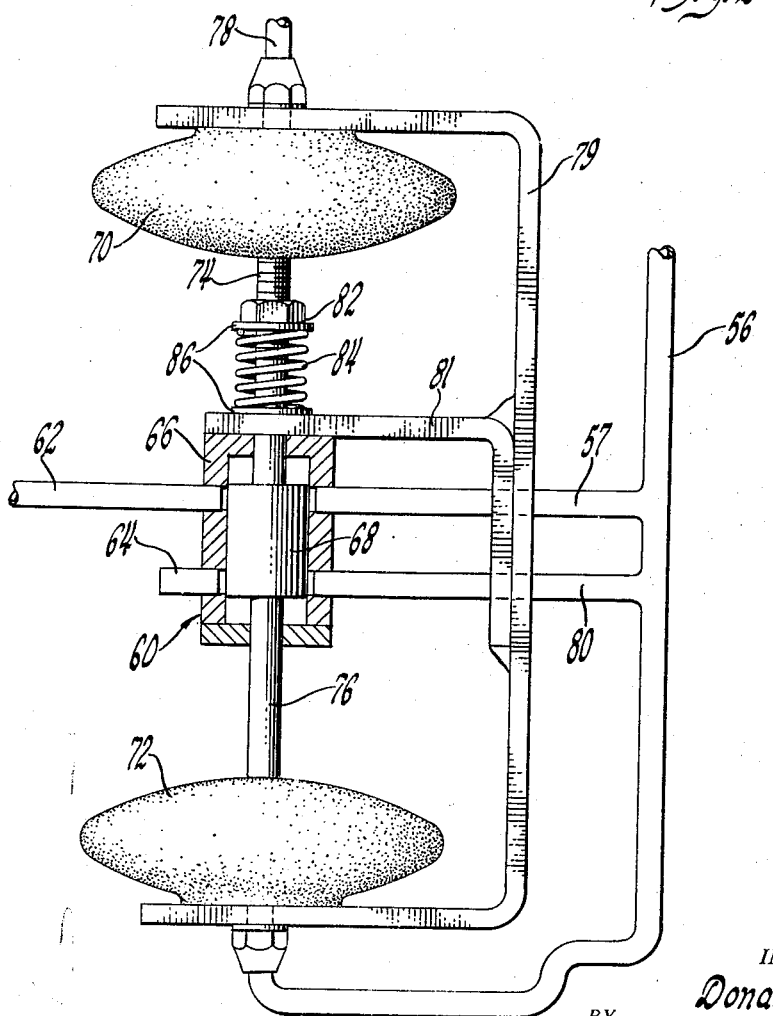
INVENTOR.
Donald J. LaBelle
BY
ATTORNEY.

United States Patent Office 2,864,454
Patented Dec. 16, 1958

2,864,454

LOAD RESPONSIVE FLUID SUSPENSION AND TRACTION INCREASING SYSTEM FOR TANDEM AXLES

Donald J. La Belle, Huntington Woods, Mich., assignor to General Motors Corporation, Detroit, Mich., a corporation of Delaware Application June 20, 1956, Serial No. 592,606

4 Claims. (Cl. 180—22)

This invention relates to tandem axle vehicles and more particularly concerns such vehicles in which one of the axles is a driving axle.

Considerable difficulty has been experienced with vehicles of the indicated type on icy or wet streets or roads, especially where there are grades to be negotiated. This difficulty owes to inadequate traction of the driving wheels with the road surface due to insufficient weight over the driving axle relative to the idler axle or axles.

The weight on the axles is, of course, a function of the load and distribution of the load to assure proper traction of the driving wheels where the road surface is slippery, is not always feasible and seldom, if ever, convenient.

The present invention aims to provide apparatus whereby the load on the driving axle or axles may be quickly changed as determined by the prevailing conditions.

Another object is to provide apparatus easily controllable to comply with State and intrastate regulations setting differing maximum limits on driving axle load.

A specific object is to provide apparatus for the purpose indicated which may be made an integral part of an air suspension system.

The invention will be particularly described in terms of a preferred embodiment thereof illustrated by the accompanying drawings in which:

Figure 1 is a fragmentary side elevation showing the rear portion of a tandem axle vehicle equipped according to the invention; and Figure 2 is a generally diagrammatic representation of the apparatus controlling the load on the driving axle.

Referring first to Figure 1, the numeral 10 denotes one of the side rail components of the vehicle frame. A first bulkhead 12 depends into the space between the driving wheel 14 and an idler wheel 16. A second bulkhead 18 is disposed forwardly of the driving wheel and mounts a levelling valve 20 having a lever 22 connected via a link 24 to a beam 26. The latter is secured to the driving axle 28 and provides seats for air springs 30 supporting the body of the vehicle through an air reservoir 32 which may be integrated with the frame.

Levelling valve 20 which may conform with the valve described and claimed in Rossman Patent 2,670,201 of February 23, 1954, receives its air supply via a conduit 34 from a tank 36 maintained at a predetermined pressure by a compressor, not shown, normally powered by the vehicle engine through the generator shaft. Check valve 38 prevent back flow once the tank is up to pressure.

In addition to conduit 34, the levelling valve has extending therefrom a short conduit 40 terminating at the reservoir 32 and a vent 42 open to the atmosphere. The modus operandi of the levelling valve being fully explained in the above identified Rossman patent, suffice it to say here that the purpose of the valve is to maintain the vehicle body at a constant level irrespective of load. Thus on an increase in load, lever 22 is swung counterclockwise to open the reservoir 32 to the air tank 36, the additional air thus charged to the reservoir and hence to the springs 30 serving to compensate for the load increase. On a decrease in load, the lever 22 is swung oppositely and air is discharged from the reservoir and the springs so that the body of the vehicle is prevented from rising beyond the selected level.

Idler wheel 16 has associated therewith a beam 50 suitably fixed to the axle 52 and mounting air spring 30′, these springs being connected at their upper ends to an air reservoir 54 which, like reservoir 32, may be built into the frame of the vehicle.

Reservoir 54 and springs 30′ are connected via a conduit 56 and branch conduits 57 and 80 to a proportioning valve 60. This valve receives air from tank 36 via a conduit 62 and vents to the atmosphere at 64. Within the valve housing 66 is confined a spool 68 connected via reach rods 74 and 76, respectively, to a pair of pressure-responsive devices, these being shown as having the form of air bellows 70 and 72. Bellows 70 has a connection 78 with reservoir 32 while bellows 72 is similarly connected through conduit 56 to reservoir 54.

The apparatus including the bellows is fixed to the bulkhead 12 via a bracket mounting 79 having an arm 81 apertured at its free end to accommodate the reach rod 74. A nut 82 threaded on such rod loads a spring 84 disposed between two washers 86 serving as seats for the spring.

To explain now the operation of the apparatus just described let it be assumed that the conditions under which the vehicle is being operated are such that the load may be substantially equally distributed between the driving axle 28 and the idler axle 52. Under these conditions, nut 82 is in its uppermost position so that the spring 84 presents no appreciable resistance to the movement of the reach rod 74 on an increase of pressure in the bellows 70. Thus, the system including air reservoir 54 and the associated springs 30′ will be maintained at substantially the same pressure prevailing in the system comprising reservoir 32 and spring 30, considering that any pressure increase or decrease in the latter system will be marked by lowering or raising of the spool 68 with connection of the conduit 56 to the line 62 or to the vent 64 as the case may be. Now, let it be assumed that slippery conditions are met with making it desirable to increase the weight on the driving axle 26 and decrease the weight on the idler axle 52. In such case, the operator has only to manipulate the nut 82 to load the spring 84 thereby to impose a resistance to movement of the reach rod 74. This obviously will render it more difficult for the pressure in the bellows 70 to displace the spool 68 downwardly to admit air from tank 36 to the reservoir 54; hence a pressure differential develops as between such reservoir and reservoir 32 favoring the latter reservoir. As a result, the load on the idler axle 52 lessens and the driving wheels 14 gain improved traction.

Should the pressure in the reservoir 32 and the corresponding springs become reduced as a consequence of a stop to discharge cargo, for example, causing actuation of the levelling valve 20 with exhaustion of air therefrom, spring 84, with the aid of the pressure at 72, will displace the spool 68 upwardly releasing pressure from the reservoir 54 through conduit 80 and vent 64 until the pressure differential therebefore prevailing is restored. Conversely, an increase in pressure in reservoir 32 and springs 30 following a load increase will be marked by the charging of additional air to reservoir 54 to maintain the differential.

On the foregoing, it should be apparent that the extent of the weight transfer from the trailing or idler axle to the driving axle is a function of the pre-load placed on the spring 84 by the nut 82. The adjustment provided by the nut is manifestly advantageous, if not critical, where the vehicle is operated in a plurality of locales having different limits on driving axle loading. In the event the vehicle is operated only in a single locality where the load regulation does not vary with the road and assuming it is desirable at all times to have a greater load on the driving axle, it is feasible to dispense with the nut and the associated spring and employ bellows of different reaction areas to obtain the desired pressure differential.

The invention thus being described and illustrated what is claimed is:

1. In a multi-axle vehicle including a driving axle and an idler axle, springs means between each axle and the vehicle body, said spring means utilizing a fluid as the elastic medium, a source of fluid pressure having connection with said spring means, and separate valve means controlling the fluid flow to and the discharge of fluid from said spring means, the valve means functional with with relation to the spring means associated with said idler axle being governed by a pair of pressure-responsive devices exerting opposing forces on such valve means, one of said devices being in open communication with the spring means associated with the idler axle, the other being in open communication with the spring means associated with the driving axle.

2. In a multi-axle vehicle including a driving axle and an idler axle, spring means between each axle and the vehicle body, said spring means utilizing a fluid as the elastic medium, a source of fluid pressure having connection with said spring means, and separate valve means controlling the fluid flow to and the discharge of fluid from said spring means, the valve means functional with relation to the spring means associated with said idler axle being governed by a pair of pressure-responsive devices exerting opposing forces on such valve means, one of said devices being in open communication with the spring means associated with the idler axle, the other being in open communication with the spring means associated with the driving axle and comprising mechanical means adjustable to determine the fluid pressure required therein to displace said last valve means against the opposing fluid pressure.

3. In a multi-axle vehicle including a driving axle and an idler axle, an air spring between each axle and the vehicle body, each such spring being open to a corresponding reservoir carried by the vehicle, a source of fluid pressure having connection with each said reservoir, and valve means controlling the fluid flow to and the discharge of fluid from the reservoir corresponding to the air spring between the driving axle and the vehicle body, and separate valve means controlling the fluid flow to and the discharge of fluid from the reservoir corresponding to the air spring between the idler axle and the vehicle body, said last valve means being governed by a pair of pressure-responsive devices exerting opposing forces thereon, one of said devices being in open communication with the reservoir associated with the air spring functional with relation to the idler axle, the other being in open communication with the reservoir corresponding to the air spring associated with the driving axle and comprising mechanical means adjustable to determine the fluid pressure required therein to displace said last valve means against the opposing fluid pressure.

4. A system as defined by claim 3 in which said pressure-responsive devices are connected to said last valve means by reach rods and react against a supporting bracket fixed to the vehicle body or frame and in which the said mechanical means takes the form of a spring reacting against a portion of said bracket and pre-loadable by a nut threaded on the corresponding reach rod.

References Cited in the file of this patent

UNITED STATES PATENTS

| | | |
|---|---|---|
| 1,857,249 | Marcum | May 10, 1932 |
| 2,087,255 | Hickman | July 20, 1937 |
| 2,691,420 | Fox et al. | Oct. 12, 1954 |